United States Patent [19]

Thompson

[11] 4,216,241
[45] Aug. 5, 1980

[54] METHOD OF BAKING AN ENGLISH MUFFIN AND PRODUCT THEREOF

[76] Inventor: Jerome B. Thompson, Box 231 - Rte. 3, Cumberland, Md. 21502

[21] Appl. No.: 964,509

[22] Filed: Nov. 29, 1978

Related U.S. Application Data

[63] Continuation-in-part of Ser. No. 843,498, Oct. 19, 1977, abandoned.

[51] Int. Cl.² .................. A21D 13/00; A21D 8/06; A21B 5/02
[52] U.S. Cl. ............................ 426/549; 99/426; 99/447; 99/448; 99/450; 126/390; 249/121; 426/19; 426/27; 426/505; 426/496
[58] Field of Search .............. 249/121, 133; 426/496, 426/505, 19, 27, 549; 126/390; 99/388, 426, 488, 450, 448, 380, 384, 416, 447, 449, 430, 441

[56] References Cited

U.S. PATENT DOCUMENTS

| | | | |
|---|---|---|---|
| 410,936 | 9/1889 | Seifert | 99/447 |
| 525,736 | 9/1894 | Duhrkop | 99/430 |
| 656,032 | 8/1900 | Meredith | 99/428 |
| 1,020,004 | 3/1912 | Wishman | 99/426 |
| 1,234,407 | 7/1917 | Stiga | 99/380 |
| 1,388,364 | 8/1921 | Miller | 249/DIG. 1 |
| 1,476,910 | 12/1923 | Naugle | 249/121 |
| 1,734,731 | 11/1929 | Katzinger | 249/133 X |
| 1,749,433 | 3/1930 | Kussa et al. | 126/390 |
| 1,764,253 | 6/1930 | Foerch | 99/447 |
| 1,764,685 | 6/1930 | Kollman | 126/390 |
| 1,876,701 | 9/1932 | Lemmon | 426/383 X |
| 1,974,186 | 9/1934 | Kollman | 99/448 |
| 2,082,973 | 6/1937 | Prabell | 249/121 X |
| 2,221,052 | 11/1940 | Kratzer | 249/121 |
| 3,247,302 | 4/1966 | Lewis | 220/9 R |
| 3,273,243 | 9/1966 | Lind | 99/430 |
| 3,339,878 | 9/1967 | Lind | 249/121 X |

OTHER PUBLICATIONS

Baking Science and Technology Pyler 1973, pp. 800, 801.

*Primary Examiner*—Steven L. Weinstein
*Attorney, Agent, or Firm*—James F. Jones

[57] ABSTRACT

A method for the production of a new and novel English muffin on a mass production basis is provided wherein the English muffin is produced by the use of a conventional bun oven and an insulated baking pan which prevents an overbaking of the bottom of the English muffin and a perforated cover plate which permits an even baking of the top surface and imparts a pattern effect on the top surface of the English muffin corresponding to the perforations in the cover plate. The resulting English muffin is new and novel, and in addition to the pattern effect on the top surface thereof, will possess a uniform color on the top and bottom surfaces thereof.

3 Claims, 8 Drawing Figures

METHOD OF BAKING AN ENGLISH MUFFIN AND PRODUCT THEREOF

RELATED APPLICATION

This application is a continuation-in-part of my application Ser. No. 843,498, filed Oct. 19, 1977, and which is now abandoned.

BACKGROUND OF THE INVENTION

The present invention relates to a new and improved dough product known as an English muffin and the method of producing same. Such a product is of a European origin but in recent years the production and consumption of English muffins in the United States has been growing at a remarkable rate. This rate of growth has been so great that today the English muffin has ceased to be a specialty item and is now considered to be a staple food product.

A traditional English muffin basically was made from a dough composed of flour, water, yeast and salt, with the water being about 75 to 80 parts by weight to 100 parts of the flour. The dough was allowed to ferment for several hours after which time it was ready for use and the dough was thereafter cut to a size having a weight of approximately 1½ to 2 oz. The pieces of dough would then be dropped into iron rings, placed on a canvas covered support, dusted with corn meal, and each piece or ball of dough would then be permitted to rise to a level approximating the top of the ring retainer. The top of each dough piece might also be sprinkled with corn meal and the piece then permitted to stand until properly proofed.

The dough pieces after being properly proofed were transferred by means of a metal spatula to a grill heated to a temperature in the range of 350°–450° F. and then grilled for about five minutes on the bottom or canvas side. Each piece so grilled would thereafter be turned over and grilled for another five minutes on the other side.

The resulting English muffin is characterized as a rather heavy bun, flat on one or the bottom side and slightly convex on the other or top side, and is about 3½–4 inches in diameter, about an inch thick, and has a weight of 1½ to 2 ounces. The top and bottom surfaces of the English muffin clearly reflect the grilling procedures employed since each surface is generally somewhat different in color and the area therebetween is white. The body of the English muffin is characterized by having a plurality of medium to large holes throughout forming, when split, opposed surfaces having a plurality of peaks and valleys thereon.

The procedure just described for producing English muffins originally was carried out by hand. Such a procedure did not require extensive equipment nor was the production large. A typical rate of production was on the order of six to twelve dozen per hour and was generally limited to the grill size that could be handled by the baker. However, with the increasing popularity of English muffins, production by hand was found insufficient to satisfy the ever increasing needs of the consumer. As a result thereof, activity was initiated towards a mechanization of the procedure for making English muffins such that the rate of production could be materially increased as well as providing a more economical procedure and product.

A mechanized procedure resulting from the need of increased and more economical production is one in which he dough mass is divided and rounded into balls and dropped into canvas pockets in a continuously traveling proofer which have been dusted with corn meal. After proofing at 115°–120° F. at 87–89% RH for thirty minutes, the raised muffin dough pieces are turned into cups which have been heated to 275° F. The dough pieces stay at 275° F. for one and a half minutes and then the traveling grill goes to a temperature of 390° F. for a period of four and a half minutes. This operation grills the bottom side of the English muffin. The half fried muffins are then each turned over and laid on a lower reverse hearth without cups and grilled at 390° F. for three minutes. The English muffins are then removed, cooled, and packaged. The muffins may be partially split before packaging, if desired. Such an operation may produce up to about a thousand dozens per hour. A description of such a process is given in considerable detail in "Proceedings of the 47th Annular Meeting of the American Society of Baking Engineers" (ASBE) (1971), pages 128–135.

While this mechanized operation has been found satisfactory for giving a materially increased production of English muffins, the system possesses certain inherent disadvantages. A basic one is that the initial monetary outlay for such a system is in excess of a quarter of a million dollars. Moreover, the apparatus can be used only for producing English muffins and is therefore incapable of being otherwise incorporated into a standard baking operation. Thus, the baking of English muffins has been limited only to those very large national or regional bakeries who, by only their size, can afford the initial capital outlay for such expensive equipment needed to produce English muffins on a large production basis.

Still another disadvantage of such a mechanized operation is that the finished product will oftentimes be of irregular size and dimension. Thus, a uniformly circular configuration and uniform thickness with respect to the finished product is not generally attainable. This is due primarily to the feeding of the dough balls from the proof unit to the pockets and also as a result of the turning operation of the muffins from the cooked side to the uncooked side.

SUMMARY OF THE INVENTION

The present invention is directed to the production of English muffins having improved characteristics and which can be produced in mass quantity in a very economical manner without any major capital expenditure for expensive systems designed only for the production of English muffins. It has been found in accordance with the present invention that it is possible to provide a method and apparatus for the production of English muffins in mass quantity employing existing bun baking equipment and requiring only the capital expenditure for the baking pan apparatus of the present invention.

Moreover, in accordance with the present invention it has been found that the need for turning the English muffins from one side to another to achieve the desired grilling can be eliminated since only a single baking operation is required. This makes it possible, therefore, to produce an English muffin equally browned on both sides in a much simpler and far more economical manner. Another novel feature of the present invention is that the muffin will have a patterned effect on one or both sides and will possess a more uniform color. Moreover, the resulting English muffin will be quite uniform in circumferential configuration and of a uniform thickness, and will be generally flatter on both sides and will pack better than the English muffins previously produced. This is a highly desirable characteristic in the finished product since it makes it possible to use the English muffins in making sandwiches and the like, and also will result in an English muffin that will toast more evenly in a toaster than prior English muffins. Moreover, the English muffins produced in accordance with the present invention has been found to be superior in flavor and texture.

Another aspect of the present invention is the provision of new and novel equipment which will be found to be of particular utility in producing English muffins in accordance with the present invention. Such equipment includes a new and novel pan structure in which the dough pieces will be positioned and a new and novel cover member which is to be employed with the pan to achieve the desired production of an English muffin by a baking operation and without a turning operation, required heretofore in the grilling procedure used for English muffins.

Broadly stated, the method for the production of English muffins in accordance with the present invention comprises preparing a conventional English muffin dough formulation, dividing the dough formulation into a plurality of individual dough pieces, flattening the individual dough pieces to a desired thickness, placing the flattened dough pieces into individual cup means present in baking pan means, the cup means in direct contact with said dough pieces being insulated from direct contact with the oven heat, placing perforated cover means over said baking pan means and in engagement with the top surface of said cup means, said cover means being of a weight sufficient to remain in contact with the top surface of said cup means during the entire baking operation, baking the dough pieces at a temperature and for a period of time sufficient to bake the dough pieces and impart an even color on the top and bottom surfaces of the baked English muffins and forming a pattern on the top surface of the baked English muffins corresponding to the perforations of the cover means and thereafter removing the baked English muffins from the cup means.

The baking apparatus of the present invention for use in baking English muffins comprises a baking pan, a plurality of spaced cup units positioned in said pan, each of said cup units being insulated such that the surface of each cup in actual engagement with the dough pieces to be placed in the cup units will be heated indirectly by the oven heat, and perforated cover means for positioning on the top of said baking pan to cover same, said cover means being of a weight sufficient to remain in contact with the baking pan throughout the baking operation and thereby forming on the surface of the English muffin a pattern effect corresponding to the perforations in said cover.

The preferred cup unit construction to provide the desired insulation therefore comprises an outer cup portion which will be in direct engagement with the oven heat and an inner cup portion positioned within said outer cup portion in inwardly spaced relationship forming a dead air space therebetween. The English muffin dough piece will be positioned in the inner cup portion and will be baked by indirect heat by the heat transfer through the dead air space. An insulating effect can also be achieved by having the cup unit in the form of a single cup portion and mounting a heat insulating layer of insulating material, such as, for example, asbestos or fiber glass, on the outside surface thereof. In either instance, this construction will result in a baking of the English muffin so as to impart a similar or same color on both the top and bottom surfaces.

DETAILED DESCRIPTION OF THE INVENTION

Figure 1:
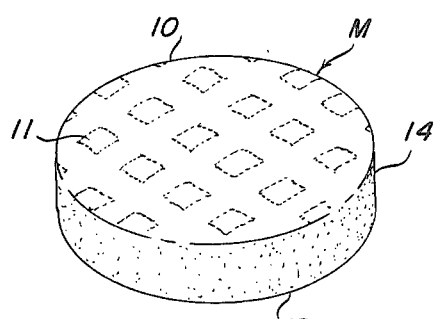
FIG. 1 is a perspective view of an illustrative embodiment of an English muffin made in accordance with the present invention illustrating the diamond pattern effect on the top surface of the muffin.

In the production of an English muffin made in accordance with the present invention, the dough formulation to be employed may be of any type heretofore employed in producing English muffins. A dough formulation that will be found to be of particular utility in the practice of the present invention is the so-called "no-time" dough. An example of such a dough formulation is as follows:

| Ingredients | Parts/100 flour | | #/dough |
|---|---|---|---|
| Flour | 100.00 | | 500 |
| Sugar | 2.00 | | 10 |
| Lard | 1.00 | | 5 |
| Yeast | 4.50 | | 22–8 oz. |
| Calcium propionate | .50 | | 2–8 oz. |
| Fumaric Acid | .23 | | 1–2.5 oz. |
| Water | 87.00 | (variable) | 435 |
| Salt | 2.25 | | 11.25 |

In the preparation of the "no-time" dough formulation as above presented, all of the ingredients except the salt are placed in the dough mixer and mixed initially at a low speed for about three minutes to wet the dry materials. The dough is thereafter mixed at high speed until there are signs of over-mixing, such as stringiness and stickiness. When the dough has reached this state, the salt is then added and the dough mixed for a period of about one to two minutes until the over-mixed characteristics of the dough disappear. It is preferred that the dough should come out of the mixing operation at a temperature of about 80° F.

The dough is thereafter removed from the mixer and permitted to stand for a period of time of about ten to fifteen minutes. The dough is then taken to a standard bun divider of the type normally found in wholesale bakers and divided into the desired dough pieces or balls. In a standard operation the dough balls will weigh approximately sixty-seven grams apiece. The dough balls are thereafter placed in the standard bun overhead proofer and dusted with corn meal. After approximately five minutes, the dough balls are flattened to a thickness approximately three-eights of an inch or so by passage between a pair of rollers, which are a normal part of a bun machine.

The dough pieces in this state are now ready for passage to the new and novel pan structure of the present invention. The dough pieces are thereafter deposed in the individual cups present in the pan and may be of the type shown in FIGS. 1 and 2. The pans to be employed in the present invention must be one in which each of the cups will be insulated such that the surface against which the dough pieces will rest is indirectly heated or otherwise insulated against the direct heat of the oven. If this is not done, the bottom surface of the muffin will be browned to a much greater extent than the top surface of the muffin. The pan containing the dough pieces is thereafter moved to a wet proof box maintained at a temperature of about 115° F. for proofing. The pan containing the dough pieces is permitted to remain in the wet proof box for about thirty to sixty minutes, or until the dough has risen to at least one-eighth of an inch of the top of the pan.

The pan containing the proofed dough pieces is not in a state ready for baking. A cover plate or lid is now fitted over the pan, the cover plate being of a type shown in FIG. 4. The function of the cover plate is to retain the rising of the muffin and also to shape the top surface of the dough piece during the baking operation in the oven. The cover plate should be of a weight sufficient to maintain contact with the top surface of the pan throughout the baking operation and to resist the oven spring normally occurring during the baking of the dough pieces. The cover plate, in order to function in its intended manner, must be perforated to an extent that a considerable proportion of the cover plate will be open, thus exposing a considerable amount or area of the dough pieces to the direct heat of the baking oven. It has been found that an imperforate cover will not function in the present invention since the dough upon contacting the hot metal during the oven spring period will draw back from the metal and thus will fail to brown. The perforations in the cover plate may be of any desirable configuration or size, such as, for example, circular holes, square area openings, openings having slits, triangled openings, diamond openings, or the like. However, it must be noted that the size and configuration of the openings in the cover plate should be such that dough will not rise or extrude through the openings to a point above the top surface of the cover plate.

The use of the perforated cover plate will also result in the top surface of the English muffin having a design or pattern formed thereon corresponding to the pattern of the perforations or openings present in the cover plate. For example, a cover plate having circular perforations therein will result in an English muffin having a surface pattern of circular mounds corresponding to the circular openings. In the same manner, if the cover plate were made in an expanded metal configuration in which the perforations or openings therein were diamond shaped, the surface of the English muffin would have a design or raised diamond mounds thereon.

The covered pan is now placed in the bun baking oven and is ready to be baked. In a general bun baking operation there normally will be four pans per shelf in a typical thirty-two shelf bun oven. The pans will be baked for about 500° F. for about nine minutes or at a time and temperature procedure typical for baking rolls or buns. Thus, the normal rate of production of English muffins in accordance with the present invention and using a conventional bun baking oven will be on the order of twelve hundred dozens per hour. Upon completion of the baking of the English muffins, the pans are withdrawn from the oven and the lids removed. The English muffins so produced are thereafter depanned in the same manner as rolls or buns and thereafter passed to a cooling and packaging area. Each of the English muffins so produced will be found to possess a substantially identical and uniform browning of the top and bottom surfaces and each muffin is substantially flat and will have a substantially uniform thickness throughout. The lids may be reused immediately for further baking, and the pans after the necessary cooling operation.

The procedure just described hereinbefore with respect to the "no-time" dough formulation may be employed equally as well with other dough formulations and procedures heretofore employed in producing English muffins. For example, a so-called "straight dough" formulation may be employed. In the use of such a formulation, the dough mixture is permitted, after mixing, to ferment several hours being dividing. The procedure to be followed thereafter to produce the desired English muffins will be the same as hereinbefore described with the "no-time" dough formulation.

In the case of a so-called "sponge dough" formulation, after the initial mixing and fermentation of a portion of the total dough ingredients for several hours, the fermented portion of the total ingredients is returned to the mixer containing the remainder of the dough mass, and then mixed. The resulting dough mixture is then ready for processing in the same manner as hereinbefore described with the "no-time" dough mixture.

Figure 4:
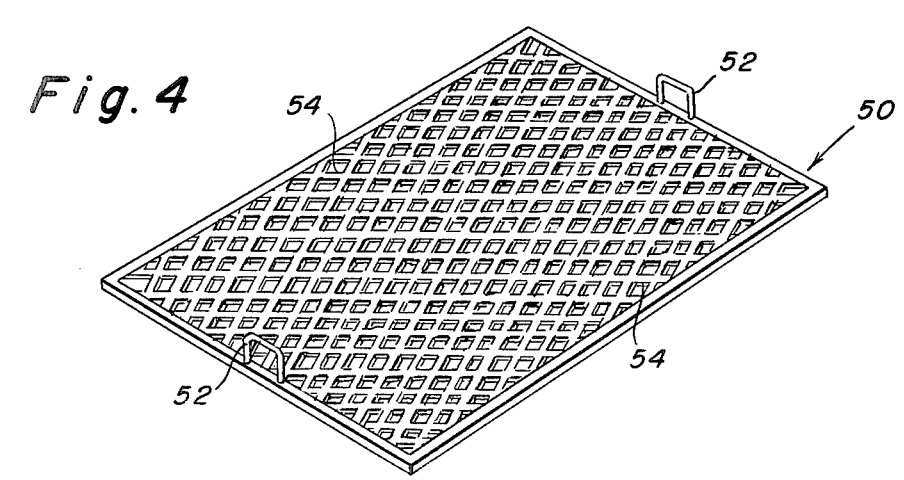
FIG. 4 is a perspective view of a cover plate made in accordance with the present invention for association with the baking pan shown in FIG. 2.

Reference is now to be had to FIG. 1 wherein an illustrative embodiment of an English muffin produced in accordance with the present invention is shown. The English muffin as shown possesses characteristics not present in the English muffins produced by systems heretofore employed. As illustrated, the English muffin, generally designated by reference letter M, has a circular, substantially flat top surface 10 having a distinctive slightly raised diamond pattern 11 on the surface thereof, with the raised portions being browned and the lower portions being substantially unbrowned. This particular diamond pattern was achieved as a result of the cover plate being made in the form of an expanded metal structure, as shown in FIG. 4. To reiterate, the pattern effect created on the surface of the English muffin may be of any configuration desired so long as such configuration is present in the cover plate. The muffin M has a flat bottom surface 12, with the top and bottom surfaces being joined to one another by a circular side wall 14 of a substantially uniform vertical thickness or height.

The English muffin M thus is a dough product that is uniformly circular in configuration and has a constant uniform thickness throughout. These are characteristics that are not normally found in English muffins produced by systems heretofore employed. Moreover, as illustrated, the English muffin M has a distinctive design imparted on the top surface thereof corresponding to the design of the perforated cover plate employed in the baking operation. This is a feature that is totally lacking in English muffins heretofore produced. It should also be pointed out that while the design shown in the English muffin M is diamond shaped, it is illustrative in character only, since, as has been pointed out more fully hereinbefore, any design resulting from design perforations in the cover plate can be imparted to the surface of the English muffin. For example, a particular proprietary design, trademark, or the like, can be imparted to the top surface of the English muffin by having the design formed in the cover plate.

It is also to be clearly understood that while in the present invention the pattern effect resulting from the perforations is shown only for the top surface of the English muffin, a similar or contrasting design effect can be imparted to the bottom portion. This can be achieved by embossing the bottom surface of the inner cup. The design resulting from the embossing of the bottom inner cup could be used to impart a design similar to that on the top surface, or a different design, such as a trademark or another proprietary design configuration.

Figure 2:
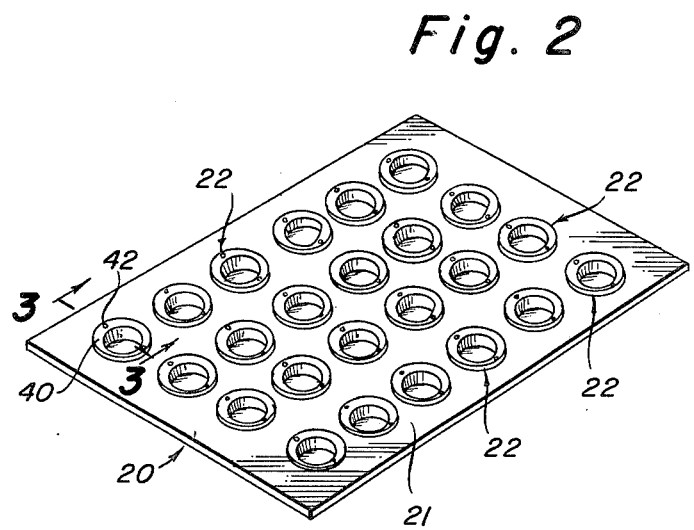
FIG. 2 is a perspective view of a baking pan made in accordance with the present invention having a plurality of cup assemblies therein into each of which a dough piece will be positioned for subsequent baking into an English muffin.
Figure 3:
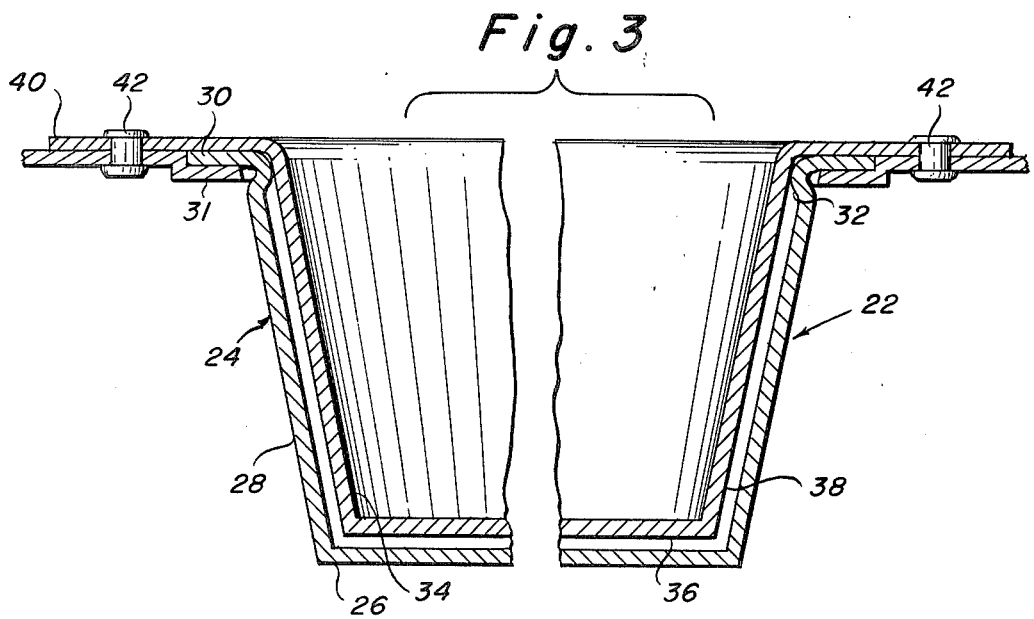
FIG. 3 is an enlarged fragmentary cross-sectional view taken along lines 3—3 of FIG. 2 and illustrating the association of a single cup assembly with the body portion of a baking pan made in accordance with the present invention.

Reference is now to be had to FIGS. 2-4 wherein an illustrative embodiment of the apparatus to be employed in the practice of the present invention is shown. In FIG. 2, a baking pan made in accordance with the present invention and generally designated by reference numeral 20 is shown. The baking pan 20 possesses a relatively thin and flat body portion 21 that is generally rectilinear in configuration. The baking pan 20 may be made of aluminized iron or any other suitable metal that may be normally employed in the producing of baking pans or sheets. The body portion 21 of the baking pan 20 is provided with a plurality of spaced recessed cup assemblies generally designated by reference numeral 22 and extending downwardly from the surface thereof and function to receive the plurality of dough pieces to be baked therein. The cup assemblies 22 made of a similar metal as the body portion 21 of the baking pan 20 are each of a circular configuration and may have a diameter of approximately four inches, this being the diameter normally employed for the production of English muffins and the cups will also have a depth of approximately one inch, this also being a more or less standard depth for such muffins. As illustrated, the baking pan 20 is provided with twenty-four recessed cup assemblies 22, and while this exemplifies a normal number for a pan design for use with conventional baking equipment, it is not intended to designate a particular given number, since the baking pan 20 can be provided with as many recessed cup assemblies 22 as desired.

Reference is now to be had to FIG. 3 wherein an enlarged showing is provided of a single recessed cup assembly 22 illustrating its mounting in the body portion 21 of the baking pan 20. This type of mounting will be the same for each of the cup assemblies 22 present in the baking pan 20. As illustrated, the cup assembly 22 includes a first or outer cup 24 having a flat, round bottom portion 26 and a cylindrical vertical wall portion 28 extending upwardly therefrom in a slightly outwardly inclined relationship. A circular flanged lip portion 30 extends radially outwardly from the top edge of the wall portion 28 and functions as the means for securing the first or outer cup 24 to the body portion 21 of the baking pan 20.

The securing of the flanged lip portion 30 of the first or outer cup 24 to the body portion 21 of the baking pan 20 may be accomplished by any suitable means, such as, for example, brazing, soldering, welding, or the like. It will be found desirable, as shown, to provide the area around the opening in the body portion 21 of the baking pan 20 into which the outer cup 24 will be positioned with a step-down flange portion 31 so that the flanged lip portion 30 may be positioned therein, thus making the top surface of the outer cup 24 substantially flush with the top surface of the body portion 21 of the baking pan 20. It is to be clearly understood that this mode of attachment of the outer cup 24 to the body portion 21 of the baking pan 20 is illustrative in character only since any means which result in a reasonably flush surface attachment of the outer cup to the baking pan may be employed.

In the formation of the flanged lip portion 30 relative to the top edge of the vertical wall portion 28 of the outer cup 24 an inwardly extending circular crimped portion 32 is to be formed around the top inner edge of the vertical wall portion 28 of the outer cup 24. The inwardly extending crimped portion 32 functions as the means for providing the association of a second or inner cup 34 within the first or outer cup 24 in spaced relationship relative to one another thereby forming a dead air space between the first cup 24 and the second cup 34. The inward distance of the crimped portion 32 may be of any suitable distance to form the necessary spacing and three-sixteenths of an inch is a distance that has been found to be satisfactory. The function of the formed dead air space will be described more fully hereinafter.

A second or inner cup 34 of the cup assembly 22 is positioned within the first or outer cup 24 in spaced relationship relative thereto. The second or inner cup 34 comprises a bottom portion 36 spaced from the bottom portion 26 of the outer cup 24 and a cylindrical vertical wall portion 38 extending upwardly and slightly outwardly from the bottom portion 36 and in inwardly spaced relationship from the vertical wall portion 28 of the outer cup 24. An outwardly extending radial flange portion 40 is secured to the top perimetral edge of the vertical wall portion 38 and extends radially outwardly over the flanged lip portion 30 and onto the top surface of the body portion 21 of the baking pan 20 in substantially flush engagement therewith. The flange portion 40 may be secured to the top surface of the body portion 21 of the pan in any suitable manner. As illustrated, one means that may be employed is the use of rivets 42 provided at spaced points. The advantage of this particular mode of attachment is to permit the drilling out of the rivets to separate the inner or second cups from the first or outer cups to permit cleaning.

While the second or inner cup 34 of the cup assembly 22 is shown as an individual component placed in spaced relationship within an outer cup 24 and secured to the body portion 21 of the baking pan 20, it is to be understood that the association of the inner and outer cups can be accomplished in other ways. For example, the entire number of second or inner cups 34, i.e., twenty-four, can be secured to a single top sheet corresponding in size to the dimensions of the baking pan 20 in a manner similar to the mounting of the first cups 24 to the body portion 21 of the baking pan 20. With this type of construction, the sheet containing the second or inner cups can be placed over the body portion 21 and the inner and outer cups respectively fitted within one another and the top sheet secured to the body portion 21 by spaced rivets or like fastening means.

The construction just described defines a baking pan having a plurality of recessed cup assemblies positioned therein into which the individual dough pieces will be placed for baking. Each cup assembly defines a construction having a dead air space between the second or inner cup 34 which will actually receive the dough piece and the first or outer cup 24. This construction having the dead air space functions to insure that during the baking operation the bottom surface of the English muffin will be properly browned so that the color of the bottom surface of the English muffin will be substantially the same as the top surface of the muffin. If the dead air space or a like insulation is not provided between the inner and outer cups, the bottom of the English muffin would be browned to an extent considerably greater than the top of the muffin such that the resulting English muffin would not possess a symmetrical or similar color on both surfaces, this being a characteristic which is expected of English muffins. Therefore, the baking pan must be one in which a proper insulation between the inner and outer cups is present to have a satisfactory cup construction.

While in the illustrative embodiment the formation of a dead air space between the inner and outer cups is preferred, it should be noted that there are other means possible by which an insulation could be employed to insure a uniform browning of the top and bottom surfaces of the muffin. For example, the cup construction could be in the form of a single cup and the desired insulating could be provided by mounting or otherwise securing an asbestos fabric or cloth to the outside side and bottom areas of the cup. Other forms of insulation, such as, for example, fiber glass or the like, could be employed equally as well as a cover for the outside of the cup. In the practice of the present invention it is to be clearly understood, however, that any means or construction resulting in an insulation of the cup into which the dough piece is positioned can be employed so long as the dough pieces will not be in engagement with a cup surface which is heated directly by the heat of the baking oven.

Turning now to FIG. 4, an illustrative form of a perforated cover plate made in accordance with the present invention and generally designated by reference numeral 50 is shown. The perforated cover plate 50 may be made of any heavy metal, such as, for example, black iron or like metal, and must be of a weight sufficient so that the cover plate will not be lifted or raised by the oven spring of the English muffins during the baking thereof, as will be described more fully hereinafter. The perforated cover plate 50, as illustrated, is rectilinear in configuration and corresponds in size to the baking pan 20, since its design is such that it will be placed on top of the baking pan 20 to complete the formation of the baking apparatus. It will be found desirable to have a pair of hooks 52 at opposite ends of the cover plate 50 to permit the placement or removal of the cover plate from the baking pan 20, either manually or mechanically.

The cover plate 50 is provided with a plurality of perforations or openings 54 that are, as shown in the illustrative embodiment, diamond-shaped in configuration. The diamond-shaped design resulting from the openings 54 in the cover plate 50 may be formed by a conventional expanded metal cover plate, this being a construction that is readily available in grids and the like. It is to be clearly understood that while the diamond-shaped openings 54 shown in the cover plate 50 are a preferred configuration for the openings therein, the openings 54 may be of any configuration desired. For example, the opening configurations may be round, square, rectilinear, triangular, hexagonal, trapezoidal, pentagonal, or any combination thereof which will impart a corresponding design pattern on the surface of the English muffin.

The function of the cover plate 50 and the openings 54 therein are essential to the attainment of satisfactory and acceptable English muffins. During the baking operation with the cover plate 50 positioned on top of the baking pan 20, by reason of the weight of the cover plate, the rising of the English muffin dough will be controlled so as to form an English muffin having flat top and bottom surfaces, which are characteristic of such items. However, during the rising of the English muffin dough during the baking thereof, the dough when it reaches the undersurface of the cover plate 50 will draw back or down from the hot surface, thus preventing the browning of the surface of the English muffin. However, by reason of the openings 54 in the cover plate 50, the English muffin dough will pass through the openings 54 resulting in a browning of the dough portions rising into the openings 54 and thereby creating a pattern effect on the surface of the English muffin. The resulting English muffin will thus have a browning color on both the top and bottom surfaces that is generally the same.

It is also to be clearly understood that while in the present invention the pattern effect created on the surface of the English muffin by reason of the perforations in the cover plate is shown only for the top surface of the English muffin, a similar or contrasting design effect can be imparted to the bottom portion of the English muffin, if desired. This effect can be achieved by embossing the bottom surface of the inner cup as distinct from forming perforations therein as with the cover plate. The design resulting from the embossing of the bottom inner cup could be used to impart a design similar to that on the top surface, or a different design, such as a trademark or another proprietary design configuration. The design effect created on the bottom, however, is cosmetic in character only and is not essential as is the design resulting from the perforations in the cover plate positioned on top of the baking pan.

Reference is now to be had to FIGS. 5-8 wherein another embodiment of a baking pan and cover structure made in accordance with the present invention is shown. It is to be understood that this illustrated embodiment will function in the same manner as the form of the invention shown in FIGS. 2-4 to produce the desired English muffins by a baking operation. This form of the invention shown in FIGS. 5-8 will be found to possess certain operational advantages over the form shown in FIGS. 2-4, although each form produces the desired English muffin.

Figure 5:
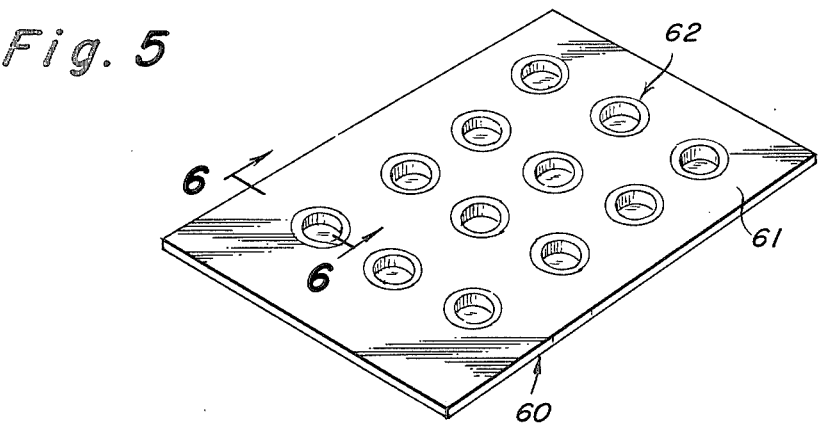
FIG. 5 is a perspective view of another form of a baking pan of the type shown in FIG. 2 and made in accordance with the present invention.

Reference is now to be had to FIGS. 5-8 wherein an illustrative embodiment of another form of apparatus to be employed in the practice of the present invention is shown. In FIG. 5, a baking pan made in accordance with the present invention and generally designated by reference numeral 60 is shown. The baking pan 60 possesses a relatively thin and flat body portion 61 that is generally rectilinear in configuration. The baking pan 60 may be made, as hereinbefore indicated with the form of the invention shown in FIG. 2, of aluminized iron or any other suitable metal, such as, for example, stainless steel, that has been normally employed in the producing of baking pans or sheets. The body portion 61 of the baking pan 60 is provided with a plurality of spaced recessed cup assemblies generally designated by reference numeral 62 and extending downwardly from the surface thereof and function to receive the plurality of dough pieces to be baked therein. The cup assemblies 62 are made of a similar metal as the body portion 61 of the baking pan 60 and each possessing a circular configuration and having a diameter of approximately four inches, this being the diameter normally employed for the production of English muffins. The cup portions of the cup assembly 62 will also have a depth of approximately one inch, this also being a more or less standard depth for such muffins. As illustrated, the baking pan 60 is provided with twelve recessed cup assemblies 62 rather than the twenty-four shown in the form of the pan in FIG. 2.

Figure 6:
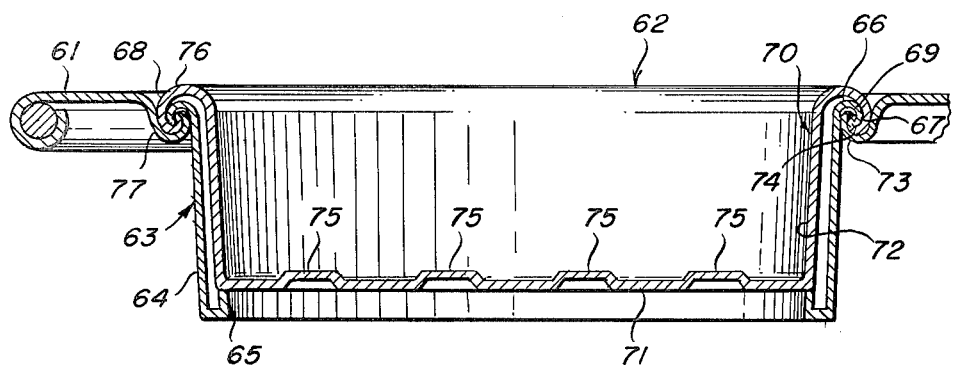
FIG. 6 is an enlarged cross-sectional view taken along lines 6—6 of FIG. 5 and illustrating the association of a single cup assembly with the body portion of a baking pan made in accordance with the present invention.

Reference is now to be had to FIG. 6 wherein an enlarged showing is provided of a single recessed cup assembly 62 illustrating its mounting in the body portion 61 of the baking pan 60 of this particular embodiment of the invention. This type of mounting described for one cup assembly will be the same for each of the cup assemblies 62 present in the baking pan 60. As illustrated, the cup assembly 62 comprises a first or outer cup 63 having a cylindrical vertical wall portion 64 extending downwardly from the top edge in a slightly inwardly inclined relationship thereto. The bottom edge of the cylindrical vertical wall portion 64 is provided with an upwardly turned, inwardly positioned cylindrical reverse bend short edge portion 65 forming a short upstanding element lying in inwardly spaced parallel relationship to the bottom part of the vertical wall portion 64. This construction results in the remainder of the bottom area of the outer cup 63 to be open, and such open area will serve a function which will be readily apparent hereinafter. The opposite and upper end of the vertical wall portion 64 is bent outwardly forming a top edge portion 66 with the free end peripheral edge thereof provided with a small roll portion 67 extending therearound. The edge portion 66 and roll portion 67 will function as the means for retaining the outer cup 63 in the body portion 61 of the baking pan 60 in attached relationship thereto.

The body portion 61 of the baking pan is provided with a plurality of openings corresponding to the number of the cup assemblies. As shown, the circular areas around each of the openings in the body portion 61 of the baking pan 60 into which a cup assembly 62 will be positioned are provided with a step-down flange portion 68 into which each of the cup portions 63 will be positioned. The peripheral edge of the flange portion 68 is provided with a small roll portion 69 which will aid in the retention of each of the cup assemblies 62 in the body portion 61. This securement will be described more fully hereinafter.

A second or inner cup, generally designated by reference numeral 70, of the cup assembly 62 is positioned within the first or outer cup 63 in laterally spaced relationship relative thereto. This forms the desired dead air space therebetween. The second or inner cup 70 comprises a bottom portion 71 abutting the top circular edge of the upwardly turned reverse bend edge portion 65 of the outer cup 63. The inner cup 70 has a cylindrical vertical wall portion 72 extending upwardly and slightly outwardly from the bottom portion 71 and in inwardly spaced relationship from the vertical wall portion 64 of the outer cup 63. The top edge of the vertical wall 72 of the inner cup 70 is outwardly bent forming a top edge portion 73. The free end of the top edge portion 73 has a small roll portion 74 formed thereon and which extends completely around the periphery of the edge portion and will function in the retention of the inner cup. The inner surface of the bottom portion 71 of the inner cup 70 is provided with a plurality of raised portions or embossings 75 for the purpose of imparting a design to the bottom surface of the English muffin. It is to be understood that this is optional and the inner surface of the bottom portion 71 can be plain.

To secure each of the cup assemblies 62 in permanently attached relationship to the body portion 61 of the baking pan 60, a description will be given for one, and it is to be understood that such description will suffice for all. In attaching the cup assembly 62 to the body portion 61, the outer cup 63 will be placed in the opening in the body portion 61. This action will result in the top peripheral edge portion 66 and the roll portion 67 of the outer cup 63 being in engagement with the recessed flange portion 68 and the roll portion 69 of the body portion 61. The inner cup 70 is thereafter placed in the outer cup 63, with the top edge portion 73 and the roll portion 74 thereof in engagement with the edge portion 66 and the roll portion 67 of the outer cup 63. The positioning of the respective roll portions 67 and 74 of the outer and inner cups 63 and 70 will be such that the inner cup 70 and the outer cup 63 will be maintained in spaced relationship from one another.

The assembled parts just described are now subjected to the action of a crimping machine to compress the respective edge portions and roll portion of the cups with the flange portion around each opening of the body portion 61 by a crimping action. The crimping action results in the flange portion 68 and the roll portion 69 overlying and compressing in and rolling around against the flange portion 66 and the roll portion 68 of the outer cup 63 thereby forming a lower bead 76 extending around the bottom surface of the body portion 61 at each opening therein. Simultaneously during the crimping action the flange portion 73 and the roll portion 74 of the inner cup 70 will compress inwardly against and roll around the flange portion 66 and the flange portion 67 of the outer cup 63 forming an upper bead 77 extending around the upper surface of the body portion 61 at each opening therein.

This action just described results in the cup assembly 62 being in tight assembled relationship with the body portion 61 of the baking pan 60. It is to be clearly understood that the assembly just described is illustrative in character only since there are other means readily available by which the cup assembly 62 can be secured to the body portion 61 of the baking pan 60.

Figure 8:
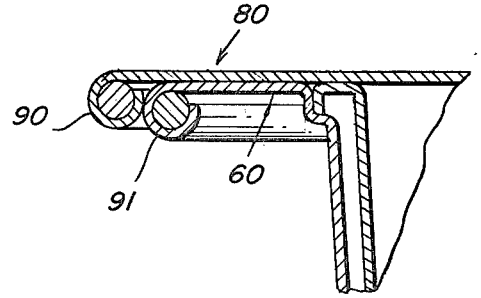
FIG. 8 is an enlarged fragmentary cross-sectional view illustrating the fitting of the cover plate with the baking pan.

The construction just described with regard to FIGS. 5 and 8 defines a baking pan having a plurality of recessed cup assemblies positioned therein into which the individual dough pieces will be placed for baking. Each cup assembly defines a construction having a dead air space between the inner cup 70 which will actually receive the dough piece and the outer cup 63. This construction having the dead air space functions to insure that during the baking operation the bottom surface of the English muffin will be properly browned so that the color of the bottom surface of the English muffin will be substantially the same as the top surface of the muffin. If the dead air space or a like insulation is not provided between the inner and outer cups, the bottom of the English muffin would be browned to an extent considerably greater than the top of the muffin such that the resulting English muffin would not possess a symmetrical or similar color on both surfaces, this being a characteristic which is expected of English muffins. Therefore, the baking pan must be one in which a proper insulation between the inner and outer cups is present to have a satisfactory cup construction. The bottom portion 71 of the inner cup 70 will be spaced above and will not be in direct engagement with the surface of the baking oven. Thus, the bottom of the English muffin will be baked by indirect heat.

Figure 7:
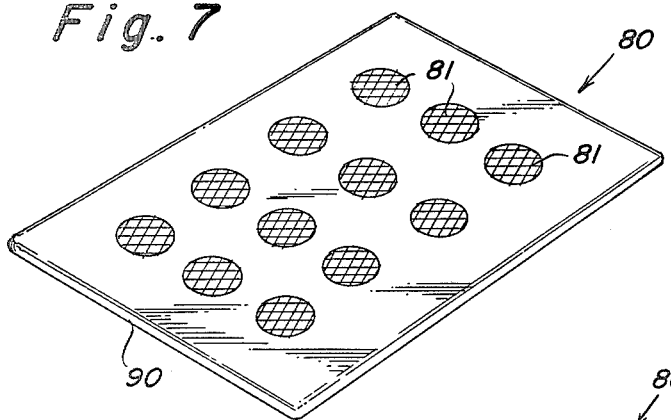
FIG. 7 is a perspective view of another form of a cover plate made in accordance with the present invention for association with the baking pan shown in FIG. 5.

Turning now to FIG. 7, an illustrative form of another form of a cover plate made in accordance with the present invention and generally designated by reference numeral 80 is shown. The cover plate 80 may be made of any suitable metal, such as, for example, aluminized iron, stainless steel, or like metal, and may be of a weight less that the cover plate 50 shown in FIG. 4 but must be of a weight sufficient to or otherwise locked to the baking pan so that the cover plate 80 will not be lifted or raised from the baking pan 60 by the oven spring of the English muffins during the baking thereof. The cover plate 80, as illustrated, is rectilinear in configuration and corresponds generally in size to the baking pan 60 since its design is such that it will be placed on top of the baking pan 60 to complete the formation of the baking apparatus. As shown in FIG. 8, the cover plate 80 is provided with a downwardly rolled edge 90 extending around the perimetral edge thereof so as to engage the downwardly rolled edge 91 extending around the perimeter of the baking pan 60. This arrangement makes it possible to achieve a locking action between the cover plate 80 and the baking pan 60.

The cover plate 80 is provided with a plurality of spaced opening areas 81, with each of the openings in each area 81 being diamond-shaped in configuration. The diamond-shaped design resulting from the openings in each area 81 in the cover plate 80 may be formed by stamping or die cutting the body of the cover plate 80 to form each area of openings therein. It is to be noted that each area 81 containing the openings in the cover plate 80 is so formed that each area when the cover plate is assembled with the baking pan will overlie or be in registry with the cup assembly in the baking pan. It is to be clearly understood that while the diamond-shaped openings in each area 81 formed in the cover plate 80 are a preferred configuration for the openings, the openings in the areas 81 may be of any configuration desired. For example, the opening configurations may be round, square, rectilinear, triangular, hexagonal, trapezoidal, pentagonal, or any combination thereof which will impact a corresponding design pattern on the surface of the English muffin.

The operation of the form of the invention shown in FIGS. 5-8 is the same as the form shown in FIGS. 2-4. The resulting product obtained from the embodiment shown in FIGS. 5-8 is the same as that shown in FIG. 1.

While there have been described herein what are at present considered preferred embodiments of the invention, it will be obvious to those skilled in the art that modifications and changes may be made therein without departing from the essence of the invention. It is therefore to be understood that the exemplary embodiments are illustrative and not restrictive of the invention, the scope of which is defined in the appended claims, and that all modifications that come within the meaning and range of equivalency of the claims are intended to be included therein.

I claim:

1. The method for producing English muffins by a baking procedure in a bun baking oven comprising preparing a conventional English muffin dough formulation, dividing the dough formulation into a plurality of individual dough pieces, flattening the individual dough pieces to a desired thickness, placing the flattened dough pieces into individual cup means present in baking pan means, the portion of said cup means in direct contact with said dough pieces being insulated from direct contact with the heat generated by the baking oven, placing perforated cover means over said baking pan means and in direct engagement with the top surface of said cup means, said cover means being perforated to an extent such that a considerable portion of the cover means will be open thus exposing a considerable area of the dough pieces to the direct heat of the baking oven, but the size and configuration of the perforations in the cover means are such that the dough will not rise or extrude through the openings to a point above the top surface of the cover means, said cover means being of a weight sufficient to remain in contact with the top surface of said cup means during the entire baking operation, baking the dough pieces in a bun baking oven at a temperature and for a period of time sufficient to complete the baking of the dough pieces, removing cover means from the baking pan upon the completion of the baking thereof producing baked English muffins having a pattern on the top surface thereof corresponding to the pattern of the perforations of the cover means, and thereafter removing the baked English muffins from the cup means.

2. A method in accordance with claim 1, wherein the baking of the English muffin dough piece is carried out at a temperature of about 500° F. for about nine minutes.

3. A baked English muffin product having a pattern effect on the top surface thereof and possessing a uniform color on the top and bottom surfaces thereof and a uniform thickness and configuration produced by the method of claim 1.

* * * * *